United States Patent [19]

Penberthy

[11] Patent Number: 4,488,694
[45] Date of Patent: Dec. 18, 1984

[54] PARACHUTE

[75] Inventor: Vivian M. Penberthy, Roodepoort, South Africa

[73] Assignee: Paralogic (Proprietary) Limited, Johannesburg, South Africa

[21] Appl. No.: 471,679

[22] Filed: Mar. 3, 1983

[30] Foreign Application Priority Data

Mar. 9, 1982 [ZA] South Africa .................. 82/1547
Mar. 9, 1982 [ZA] South Africa .................. 82/1548

[51] Int. Cl.$^3$ ............................................. B64D 17/24
[52] U.S. Cl. ................................................... 244/152
[58] Field of Search ............. 244/142, 143, 145, 146, 244/152, 149

[56] References Cited

U.S. PATENT DOCUMENTS

| | | | |
|---|---|---|---|
| 1,777,934 | 10/1930 | Owens | 244/149 |
| 2,103,806 | 12/1937 | Willing | 244/149 |
| 2,127,895 | 8/1938 | Tingle | 244/152 |
| 2,350,480 | 6/1944 | Swofford | 244/142 |
| 2,371,898 | 3/1945 | Lisi | 244/152 |
| 2,575,387 | 11/1951 | Kluylein et al. | 244/152 |
| 3,131,894 | 5/1964 | Jalbert | 244/145 |

FOREIGN PATENT DOCUMENTS

| | | | |
|---|---|---|---|
| 364408 | 11/1922 | Fed. Rep. of Germany | 244/142 |
| 896186 | 2/1945 | France | 244/152 |
| 1192116 | 10/1959 | France | 244/149 |
| 516244 | 2/1955 | Italy | 244/152 |
| 66240 | 10/1928 | Sweden | 244/152 |

Primary Examiner—Galen L. Barefoot
Attorney, Agent, or Firm—Ladas & Parry

[57] ABSTRACT

A parachute of the invention includes a canopy (11), main suspension lines (14) and an auxiliary suspension system (23, 20 and 30). The main suspension system extends between the periphery of the canopy and the load (15) and the auxiliary suspension systems extends between the load (15) and positions (D) and (A) spaced from the periphery of the canopy. The auxiliary suspension system (23, 20, 30) assumes load during the initial stages of deployment leaving the main suspension lines untensioned thereby to allow the canopy skirt to spread without interference. A subsidiary feature of the invention provides for valve members (4) spaced the vent (12) of a canopy (11). Both features result in reduced opening time of the canopy.

13 Claims, 11 Drawing Figures

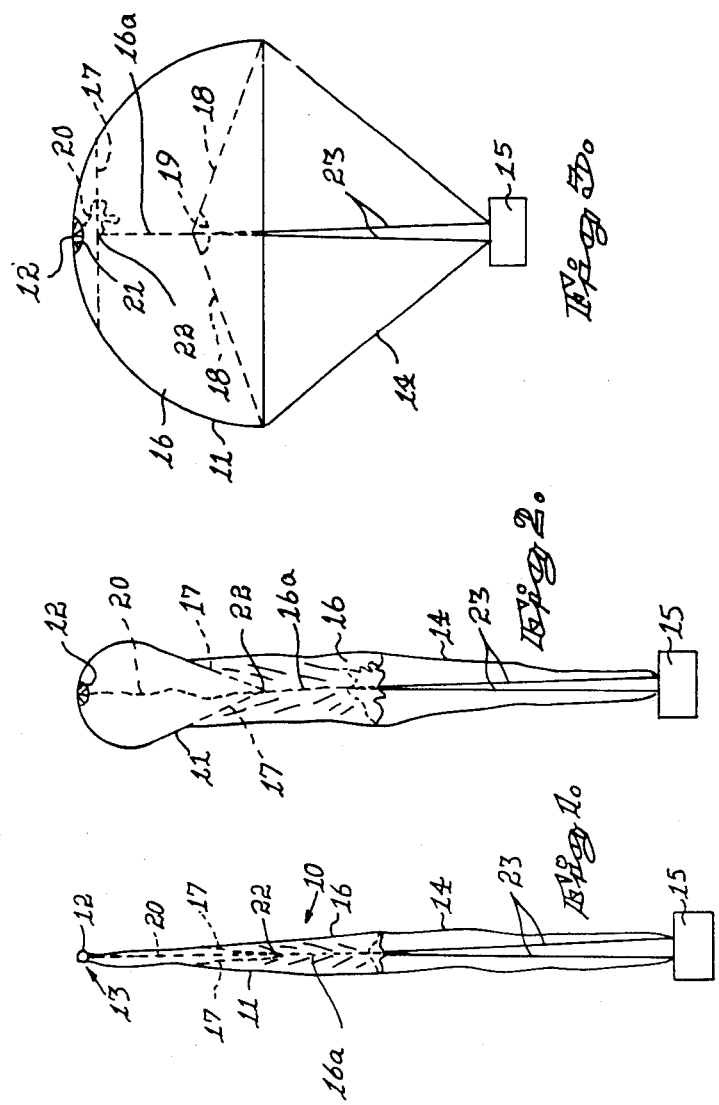

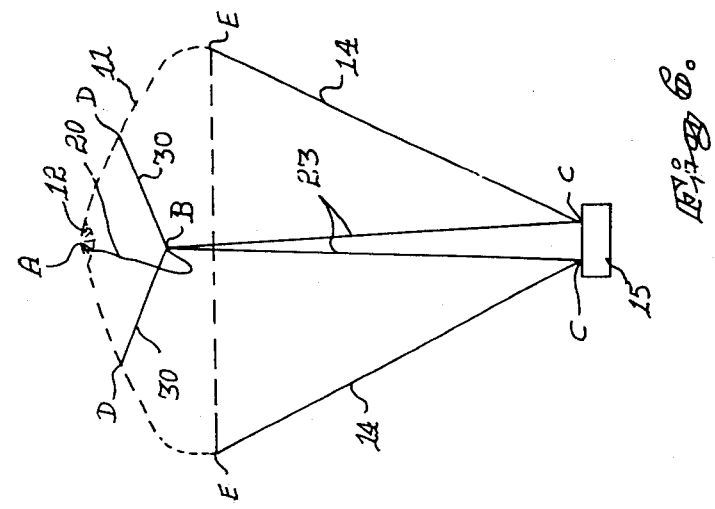
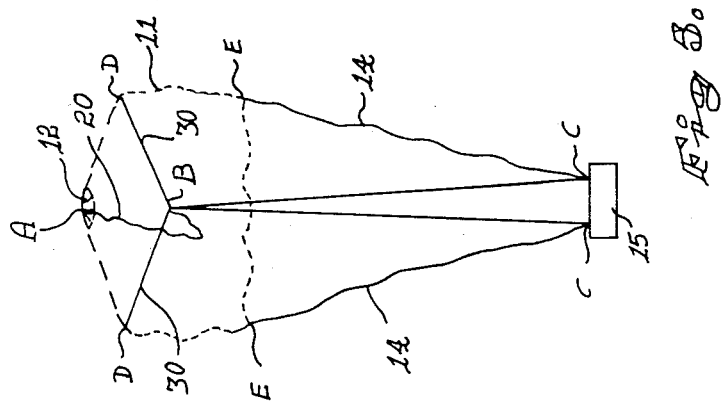
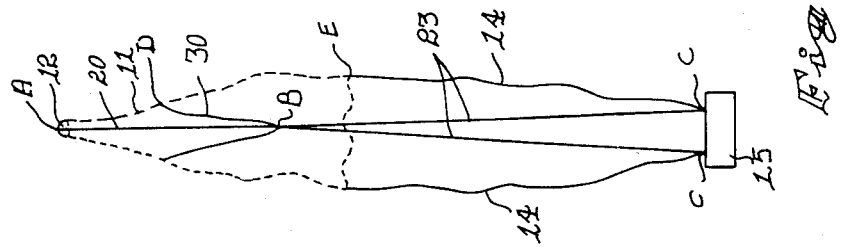

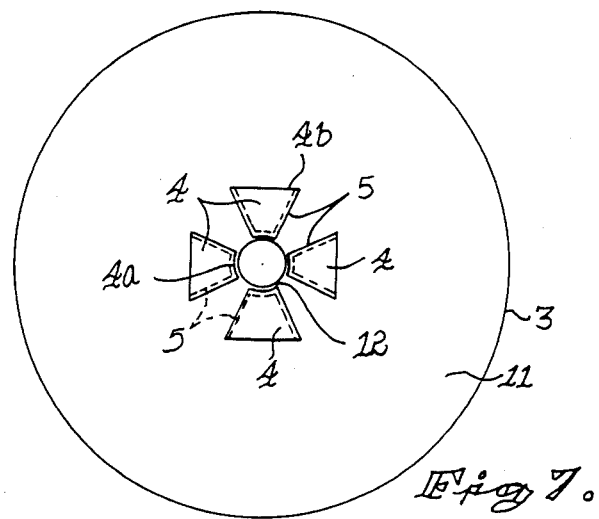
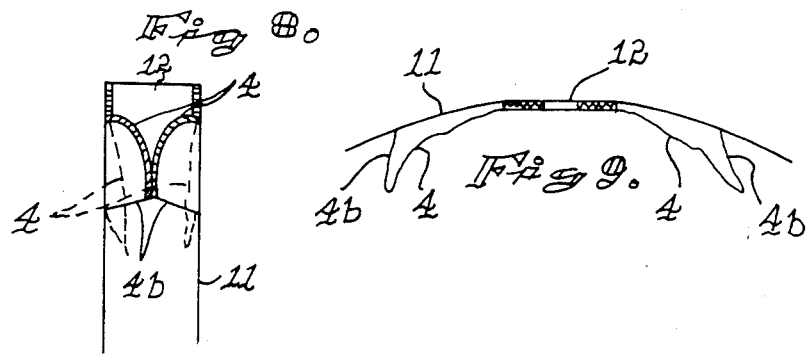

PARACHUTE

This invention relates to parachutes and more particularly but not exclusively to parachutes for military application.

A parachute conventionally comprises a canopy defining a periphery, a plurality of suspension lines secured at upper ends thereof to the periphery of the canopy and having at the lower ends thereof a connecting arrangement whereby a load, such as a parachutist, may be connected to the parachute.

In military operations it is often preferred to drop parachute troops from a relatively low altitude. The minimum altitude from which troops can safely be dropped, depends inter alia on the opening time of the parachute, that is the time it takes for the parachute to convert from streamer configuration to fully inflated configuration. The term streamer configuration is used in this specification to denote the initial stage of the deployment of a parachute immediately after the apex of the canopy has been separated from the static line. At this stage only minimal inflation of the canopy has taken place and it has a tubular shape which during inflation converts to a dome shape.

The opening time of a parachute is dependent on various design features. This invention relates to two such features.

While in its streamer configuration there is set up in the canopy certain forces which are generally referred to as skirt spreading forces. These forces result inter alia from the entrapment of air in the tubular canopy and from the flow of air over the outer surface of the canopy. It has now been realised that the gravitational force acting on the load and transmitted through the suspension lines to canopy tends to counteract the skirt spreading forces. The present invention is concerned with a means to minimise such counteraction of the skirt spreading forces.

It is further well known in the art of parachute manufacture to provide a dome parachute canopy with a vent at the apex thereof. Such a centrally disposed vent serves to allow the escape of air from the deployed parachute, thereby stabilising the parachute during descent by reducing the pendulum effect caused by air escape from below the periphery or skirt of the canopy. However, while in tubular or streamer configuration the vent allows the escape of air from the canopy when ideally all air which had already entered the canopy should remain in the canopy. A subsidiary aspect of the present invention is directed at minimising such premature air escape via the vent.

According to the invention a parachute includes a canopy defining a periphery, a connecting arrangement adapted for use in connecting the parachute to a load, a main suspension system comprising a plurality of lines spaced about the periphery of the canopy and secured to the canopy to extend between the peripheral zone of the canopy and the connecting arrangement, and an auxiliary suspension system extending between the connecting arrangement and strategic positions on the interior of the canopy which positions are spaced from the periphery of the canopy, the arrangement of the two suspension systems being such that when in use the opposing forces of drag acting on the canopy and gravity acting on the load is substantially taken up by the auxiliary suspension system leaving the main suspension system essentially untensioned while the canopy is in streamer configuration and by the main suspension system when the canopy is fully deployed.

In one application of the invention the canopy is of substantially circular planform and may for example be of a flat, conical, parabolic or hemi-spherical profile.

The canopy may be of a conventional construction constituted by a plurality of substantially triangular gores joined along main seams. The gores in turn may be constituted by a plurality of panels (normally four) joined along cross seams and each gore panel may be of isosceles trapezium or trapezoid shape, that is, a trapezium or trapezoid resulting from the truncation of an isosceles triangle.

The auxiliary suspension system may include a fabric partition sewn at its ends to diametrically opposing main seams of the canopy, and a pair of lower axial lines extending from a central position on a lower edge of the partition to the connecting arrangement.

In one form of the invention the auxiliary suspension system includes four partitions which in the deployed form of the canopy divide the canopy into four quadrants, the partitions being joined together along a line which falls substantially on the axis of the canopy when in use and the lower axial lines extending between the joint between the partitions and the connecting arrangement.

Preferably the height of the fabric partition is selected to extend between the periphery of the canopy and the uppermost cross seam on the gores joined by the main seam to which the partition is sewn. The height of the partition also preferably decreases progressively from its ends connected to the canopy to its central region so as to define an obtuse angle at the central zone of the lower edges of the partition, i.e. at the position where the lower axial lines are connected.

The auxiliary suspension system may further include an upper axial line extending between a central position on or towards the upper edge of the partition and the apex of the canopy, the length of the upper axial line being such that it is only tensioned while the parachute is in streamer configuration.

In a preferred embodiment of the invention the auxiliary suspension system comprises a plurality of internal radial lines joined at first ends thereof to the interior surface of the canopy at a position intermediate the periphery and the apex thereof and joined together at their opposite ends in a confluence, an upper axial line extending between the confluence and the apex of the canopy and a lower axial line arrangement extending between the load connecting arrangement and the confluence.

The internal radial lines are preferably connected to the canopy surface at points of intersection between main seams and cross seams. These points are hereinafter referred to as fastening points.

The lower axial line arrangement preferably comprises two lower axial lines and the load connecting arrangement also preferably comprises two spaced connector links, each lower axial line extending between the confluence and one of the connectors.

The relationships of the line and gore lengths according to this embodiment of the invention are as follows:

$$AB+BC<AD+DB+BC<AE+EC$$

wherein

AB is the length of the upper axial line extending between the apex of the canopy and the confluence of the internal radial lines;

BC is the length of the lower axial lines extending between the confluence and the connector links;

AD is the length of the gore section between the fastening points on the canopy and the apex measured along the main seam;

DB is the length of the internal radial lines extending between the fastening points on the canopy and the confluence;

AE is the gore length of the canopy, that is the distance between the apex and the periphery of the canopy measured along the main seam;

EC is the length of the main suspension lines.

Preferably (AD+DB+BC) is between 97.5% and 99.5% of (AE+EC) and (AB+BC) is between 98.5% and 99.9% of (AD+DB+BC).

According to another aspect of the present invention a parachute having a canopy of dome shaped deployed configuration and including a vent at the apex thereof is characterised in that it includes pocket formations disposed on the interior surface of the canopy in the vent region thereof, the pocket formations being arranged and adapted in use to inflate thereby to occlude the vent while the canopy is in streamer configuration and to be disposed clear of the vent when the parachute is fully deployed.

In a preferred form of the invention at least four pockets are provided and located collectively to extend about the vent.

Each pocket may be constituted by a quadrilateral flap formation of which the upper edge and two side edges are sewn to the canopy to define with the canopy fabric a downwardly open pocket formation.

In one form of the invention the flap formations may be of generally truncated triangular configuration to constitute, in association with the canopy fabric covered by the flaps, pockets of generally conical shape. The upper edge of the flaps may further be of arcuate configuration to fit neatly about a segment of the circumference of the vent.

Some embodiments of the invention will now be described by way of example with reference to the accompanying drawings.

In the accompanying drawings:

FIG. 1 is a schematic elevational view of a first embodiment of the parachute according to the present invention in its streamer configuration;

FIG. 2 is a schematic elevational view of the parachute of FIG. 1 as it begins to open;

FIG. 3 is a schematic view of the parachute of FIG. 1 in fully inflated or deployed configuration;

FIG. 4 is a schematic elevational view of an alternative embodiment of the parachute according to the invention in streamer configuration;

FIG. 5 is a schematic elevational view of the parachute of FIG. 4 as it begins to open;

FIG. 6 is a schematic elevational view of the parachute of FIG. 4 in fully deployed state;

FIG. 7 is a diagrammatic plan view of the interior of a parachute canopy of the present invention illustrating the apex valves;

FIG. 8 is a diagrammatic representation of a section of the apex zone of a parachute according to the invention when in streamer configuration illustrating the operative and inoperative dispositions of the apex valves;

FIG. 9 is a view similar to FIG. 6 but showing the parachute canopy in deployed configuration.

In the accompanying drawings the relative dispositions of the various members are exaggerated for the sake of clarity.

Figure 3A:
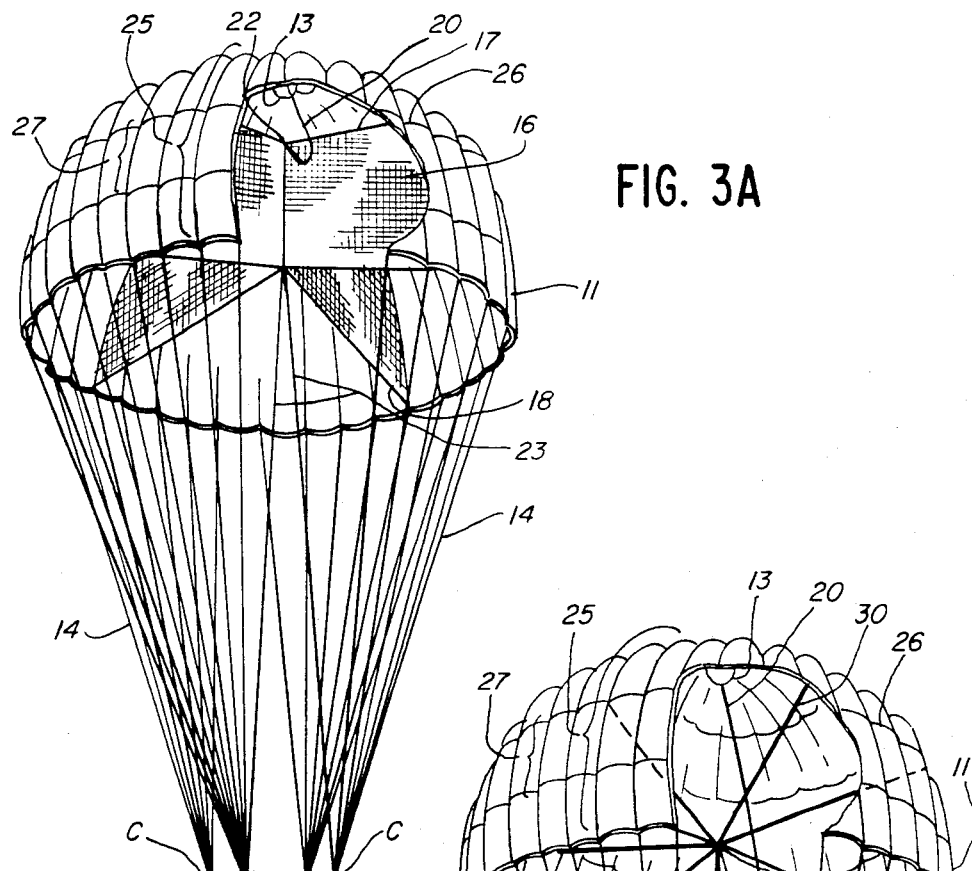
FIG. 3A is a partial cut-away view of the interior of the fully deployed parachute of FIG. 3.

Referring to FIGS. 1, 2 and 3 of the accompanying drawings in which the same numerals are used to illustrate the same components, a parachute 10 comprises a canopy 11, having a vent 12 in the apex region 13 thereof and suspension lines 14 (of which only two are shown) extending from the peripheral zone of the canopy and secured to the load 15 via connector links (not shown).

The canopy 11 is of conventional construction with radially extending main seams 25 dividing the canopy 11 into a plurality of substantially triangular gores 25. A number of cross seams 26 are provided in the canopy 11 at spaced intervals between the periphery and the apex 13 of the canopy 11. Preferably, the cross seams 26 divide the gores 25 into four panels 27 of isosceles trapezium or trapezoid shape, that is, a trapezium or trapezoid resulting from the truncation of an isosceles triangle.

A partition 16 (shown in dotted lines) having a central seam 16a is disposed in the canopy and sewn to two diametrically opposed main seams. It will be seen (FIG. 3) that the upper edge 17 of the partition 16 defines a straight line and the lower edge 18 defines an obtuse angle 19 in the centre thereof. For ease of reference only one partition is shown which divides the canopy into two segments. It is however preferred to have the canopy divided in quadrants by means of two intersecting partitions.

An upper axial line 20 is secured to the apex lines 21 and to the centre 22 of the upper edge 17 of the partition 16.

Two substantially axial lines 23 extend between a connecting point at the apex of the angle 19 and the connecting links (not shown) by which the load 15 is connected to the parachute 10.

Figure 6A:
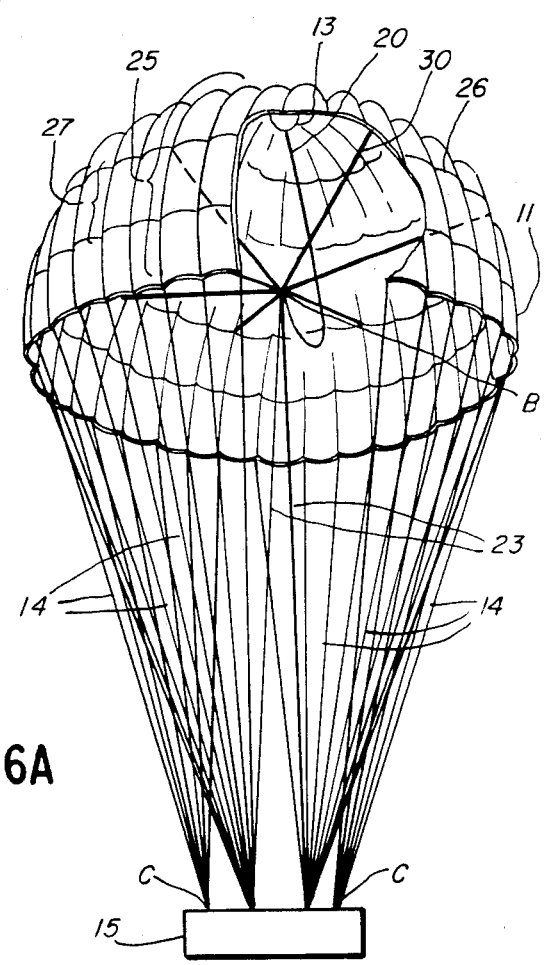
FIG. 6A is a partial cut-away view of the interior of the fully deployed parachute of FIG. 6.

In the arrangement illustrated in FIGS. 4, 5 and 6 the fabric partition shown in FIG. 3 is replaced by a number of internal radial lines 30. The internal radial lines 30 are secured to fastening points D which fall on the intersections of cross seams 26 and main seams 25 of the canopy 11. In FIGS. 4, 5 and 6 only two internal radial lines 30 are shown but it is preferred to have eight internal radial lines extending between the canopy 11 and a confluence B. An upper axial line 20 extends between the centre A of the vent 12 and the confluence B. It will be understood that the upper end of the upper axial line is connected to the apex lines spanning the vent 12. The auxiliary suspension system of the parachute further includes two lower axial lines 23 which extend between the confluence B and the connecting links C secured to the load 15.

In a conical parachute having a 30° cone angle and incorporating 30 gores the following dimensions have been found to result in a parachute of substantially improved opening speed.

Gore length (AE): 4.720 m
Suspension line length (EC): 7.370 m
Lower axial line length (BC): 7.645 m Internal radial line length (BD): 2.150 m
Upper axial line length (AB): 4.255 m
Gore segment length between apex and connecting points (AD): 2.165 m These measurements are provided as examples only and it is not the intention to limit the scope of the invention to such dimensions.

In conventional parachutes which do not include an auxiliary suspension system incorporating a partition or internal radial lines, and upper and lower axial lines as illustrates in FIGS. 1 to 6 above, the suspension lines 14 are in tensioned state while the parachute is in streamer configuration. It will be seen that the tensioned state of the main suspension lines tends to gather the periphery of the canopy to a "closed" configuration and thus opposes the skirt spreading forces and consequently reduces the opening speed of the canopy.

With the arrangement illustrated in FIGS. 1 to 3 of the accompanying drawings the opposing forces resulting from drag of the canopy when in streamer configuration and gravity acting on the load is taken up by the lower axial lines 23, by the partition 16 and specifically along the central seam 16a and the upper edge thereof, and by the upper axial line 20. It can thus be seen that the main suspension lines 14 and the lower segment of the canopy 11 remain untensioned until a considerable degree of skirt spreading has taken place. The suspension lines 14 thus come under tension only after the skirt has spread and the lines progressively assume more of the load. In fully deployed configuration substantially the entire load depends from the periphery of the canopy via the main suspension lines 14. The auxiliary suspension system (axial lines 23 and partition 16) remains in a sufficiently taut state when the canopy is fully inflated so as only to ensure that it would not interfere with the load.

The operation of the arrangement illustrated in FIGS. 4 to 6 is substantially similar to the operation of the arrangement discussed above with reference to FIGS. 1 to 3. In the arrangement of FIGS. 4 to 6, however, the load is firstly taken up by the lower axial lines 23 and the upper axial line 20, (FIG. 4), thereafter by the lower axial lines 23 and the internal radial lines 30 (FIG. 5) and finally by the main suspension lines 14. (FIG. 6)

Again it will be seen that the skirt of the canopy is free to spread to a considerable degree without any interference from the main suspension lines. It will also be seen that the auxiliary suspension system (axial lines 23 and radial lines 30) remain in relatively taut state when the canopy is fully inflated and accordingly the possibility of the load, such as a parachutist, becoming entangled therein is eliminated.

Referring now to FIGS. 7, 8 and 9 of the accompanying drawings a parachute comprises a canopy 11 defining a vent 12 in its centre and a peripheral zone 3 to which suspension lines (not shown) are secured.

Four quadrilateral flaps 4 of generally truncated triangular shape are sewn to the canopy 11 along three edges thereof as shown by the dotted lines 5 in FIG. 7. The radially extending stitches are preferably located along main seams (not shown) of the canopy.

The upper edges of the flaps 4 are shown to be curved to fit neatly along the curvature of the vent 12. As the lower edges 4b are not sewn to the canopy, the flaps constitute downwardly open pocket formations as can best be seen from FIG. 8. In FIG. 8 the dotted lines show the pockets 4 in limp or collapsed condition. The pockets or flaps 4 will normally be in this condition while no air passes through the tubular configuration defined by the canopy while it is in streamer configuration. However, once air enters the canopy the flaps are scooped and caused to billow to assume roughly a position as shown in solid lines at 4 in FIG. 8. I will be seen that in billowed condition the flaps 4 occlude the vent 12 which in turn speeds up the deployment of the parachute since entrapped air is not permitted to escape through the vent 12.

The flaps are however pulled clear from the vent as soon as the parachute canopy 1 deploys fully to assume a position roughly as shown in FIG. 9. It will be seen that the flaps 4 lie flush against the canopy when the latter is fully deployed thus leaving the vent substantially unobstructed.

I claim:

1. A parachute including a canopy defining a periphery, a connecting arrangement adapted for use in connecting the parachute to a load, a main suspension system comprising a plurality of lines spaced about the periphery of the canopy and secured to the canopy to extend between the peripheral zone of the canopy and the connecting arrangment, and an auxiliary suspension system extending between the connecting arrangement and the interior of the canopy, said auxiliary suspension system comprising upper and lower line arrangements each of which is disposed adjacent a line substantially on the axis of the canopy while the canopy is in streamer configuration and load transfer means radially disposed in said canopy and having opposed ends, one of said ends being secured to said upper and lower arrangements and the other end of said load transfer means being secured to the interior of said canopy, the arrangement of the two suspension systems being such that when in use the opposing forces of drag acting on the canopy and gravity acting on the load is substantially taken up by the auxiliary suspension system leaving the main suspension system essentially untensioned while the canopy is in streamer configuration and by the main suspension system when the canopy is fully deployed.

2. The parachute of claim 1 wherein the canopy is constituted by a plurality of substantially triangular gores joined along main seams and wherein the load transfer means includes a fabric partition sewn at its ends to diametrically opposing main seams of the canopy, and said lower line arrangement comprises a pair of lower axial lines extending from a central position on a lower edge of the partition to the connecting arrangement.

3. The parachute of claim 2 wherein the load transfer means includes four partitions which in the deployed form of the canopy divide the canopy into four quadrants, the partitions being joined together along said line substantially on the axis of the canopy when in use and the lower axial lines extending between the joint between the partitions and the connecting arrangement.

4. The parachute of claim 2 wherein each of the gores is constituted by four panels of isosceles trapezium or trapezoid shape joined along cross seams and wherein the height of the fabric partition is selected to extend between the periphery of the canopy and the uppermost cross seam on the gores joined by the main seam to which the partition is sewn.

5. The parachute of claim 2 wherein the height of the partition decreases progressively from its ends connected to the canopy to its central region so as to define an obtuse angle at the central zone of the lower edges of the partition.

6. The parachute of claim 1 wherein the load transfer means comprises a plurality of internal radial lines joined at first ends thereof to the interior of the canopy surface at a position intermediate the periphery and the apex thereof and joined together at their opposite ends in a confluence, said upper line arrangement comprising an upper axial line extending between the confluence and the apex of the canopy and said lower line arrangement extending between the load connecting arrangement and the confluence.

7. The parachute of claim 6 wherein the canopy is constituted by gores joined together along main seams and wherein the gores are made up of panels joined together along cross seams, the parachute being characterised in that the internal radial lines are joined to the canopy at fastening points constituted by points of intersection between main seams and cross seams.

8. The parachute of claim 7 wherein the lower axial line arrangement comprises two lower axial lines and the load connecting arrangement comprises two spaced connector links, each lower axial line extending between the confluence and one of the connectors.

9. The parachute of claim 8 wherein the relationships of the line and gore lengths are as follows:

$$AB + BC < AD + DB + BC < AE + EC$$

wherein

AB is the length of the upper axial line extending between the apex of the canopy and the confluence of the interal radial lines;

BC is the length of the lower axial lines extending between the confluence and the connector links;

AD is the length of the gore section between the fastening points on the canopy and the apex;

DB is the length of the internal radial lines extending between the fastening points on the canopy and the confluence;

AE is the gore length of the canopy that is the distance between the apex and the periphery of the canopy measured along the main seam;

EC is the length of the main suspension lines.

10. The parachute of claim 9 wherein (AD+DB+BC) is between 97.5% and 99.5% of (AE+EC) and (AB+BC) is between 98.5% and 99.9% of (AD+DB+BC).

11. A parachute including a canopy defining a periphery, a connecting arrangement adapted for use in connecting the parachute to a load, a main suspension system comprising a plurality of lines spaced about the periphery of the canopy and secured to the canopy to extend between the peripheral zone of the canopy and the connecting arrangement, and an auxiliary suspension system extending between the connecting arrangement and strategic positions on the interior of the canopy which positions are spaced from the periphery of the canopy, the canopy being of domed-shape deployed configuration and including a vent at the apex thereof, said canopy including pocket formations disposed on the interior surface of the canopy in the vent region thereof, the pocket formations being arranged and adapted in use to inflate thereby to occlude the vent while the canopy is in streamer configuration and to be disposed clear of the vent when the parachute is fully deployed and the arrangement of the two suspension systems being such that when in use in the opposing forces of drag acting on the canopy and gravity acting on the load is taken up by the auxiliary suspension system while the canopy is in streamer configuration and by the main suspension system when the canopy is fully deployed.

12. The parachute of claim 11 wherein each pocket is constituted by a quadrilateral flap formation of which the upper edge and two side edges are sewn to the canopy to define with the canopy fabric covered thereby, a downwardly open pocket formation.

13. A parachute including a canopy defining an apex and a periphery, a connecting arrangment adapted for use in connecting the parachute to a load, a main suspension system comprising a plurality of lines spaced about the periphery of the canopy and secured to the canopy to extend between the peripheral zone of the canopy and the connecting arrangement, and an auxiliary suspension system extending between the connecting arrangment and strategic positions on the interior of the canopy which positions are spaced from the periphery of the canopy, the auxiliary suspension system comprising a lower axial line arrangement, an upper axial line arrangement and a plurality of radial elements, the radial elements being interconnected to both the upper and lower axial line arrangements at first ends thereof and to the canopy interior at second ends thereof, and the upper and lower axial line arrangements also being interconnected to one another at second ends thereof, the first end of the upper axial line arrangement being connected to the apex of the canopy and the first end of the lower axial line arrangement being connected to the connecting arrangement and the arrangement of the two suspension systems being such that when in use the opposing forces of drag acting on the canopy and gravity acting on the load is substantially taken up by the auxiliary suspension system leaving the main suspension system essentially untensioned while the canopy is in streamer configuration and by the main suspension system when the canopy is fully deployed, the upper axial line arrangement being limp when the canopy is fully deployed and the remainder of the auxiliary suspension system being untensioned but sufficiently taut to avoid interference with the load when the canopy is fully developed.

* * * * *